March 8, 1966  A. D. MAST  3,238,865
APPARATUS FOR PELLETIZING PARTICULATE MATERIAL
Filed Sept. 19, 1963  4 Sheets-Sheet 1

Aquila D. Mast
INVENTOR
BY Jacobi & Davidson
ATTORNEYS

March 8, 1966 A. D. MAST 3,238,865
APPARATUS FOR PELLETIZING PARTICULATE MATERIAL
Filed Sept. 19, 1963 4 Sheets-Sheet 2

Aquila D. Mast
INVENTOR

Jacobi & Davidson
ATTORNEYS

March 8, 1966  A. D. MAST  3,238,865
APPARATUS FOR PELLETIZING PARTICULATE MATERIAL
Filed Sept. 19, 1963  4 Sheets-Sheet 3

Aquila D. Mast
INVENTOR
BY Jacobi & Davidson
ATTORNEYS

March 8, 1966  A. D. MAST  3,238,865
APPARATUS FOR PELLETIZING PARTICULATE MATERIAL
Filed Sept. 19, 1963  4 Sheets-Sheet 4

Aquila D. Mast
INVENTOR

United States Patent Office 3,238,865
Patented Mar. 8, 1966

3,238,865
APPARATUS FOR PELLETIZING PARTICULATE MATERIAL
Aquila D. Mast, 1316 Clayton Road, Lancaster, Pa.
Filed Sept. 19, 1963, Ser. No. 310,072
15 Claims. (Cl. 100—45)

This invention relates to apparatus for pelletizing particulate material, and finds significant utility when applied in the formation of animal food stuff pellets.

There have been various prior suggestions as to how animal food stuffs may be compacted in pellet form so as to be readily digestible by animals, and conveniently handled for transportation from place to place. Notwithstanding the various prior suggestions, however, there remains a need for a comparatively small and efficient pelleting machine adapted to handle normal animal food stuffs and form pellets therefrom.

In its more basic sense, the primary object of the present invention is to satisfy such need. More particularly, it is a primary object of the present invention to provide a method and apparatus for pelleting animal food stuffs efficiently, and such that the pelleting is achieved by taking advantage of the normal moisture content of the material, as well as the heat generated during the pelleting operation.

Still further important and general objects of the present invention are: (a) to provide such an apparatus which delivers the animal food stuff pellets made thereby in heated form so that the aroma is readily detectable by the animal; (b) to provide such an apparatus which can easily be animal activated to result in the automatic supply of heated pellets to an animal feeding station: (c) to provide such an apparatus which, by virtue of its operation, can be used to deliver the pellets to a location remote from the machine itself; and (d) to provide such an apparatus which can be conveniently used on the average farm, ranch or the like for extended periods of time with trouble-free operation.

Although the pelleting of animal food stuffs has been emphasized above, and although the apparatus hereof finds significant use for such purpose, it should be understood that the apparatus can be used in the pelleting of various and diverse types of particulate material without departing from the invention. Thus, the above objects are applicable to pelleting of particulate material generally, and have been recited in connection with animal foodstuffs only for purposes of illustration, and in light of the most important presently known application of the invention.

Consistent with the above general objects of the invention, there are certain important, yet more specific objects hereof. In particular, one of the objects of the present invention is to provide an improved drive system for converting rotary motion to linear reciprocating motion while minimizing the number of wearing parts required for the motion transformation.

Moreover, the invention is concerned with certain other improvements, while while of particular value in the apparatus of the invention, find significance in pelleting machines generally of the type which have an open bottom compression chamber in which the pellets are formed. In this regard, an object of the invention is to provide an improvement in the compression nozzles or tubes used for such purpose, which improvement is based on the discovery of desired smoothness for the interior walls of the nozzle or tube, and which improvement insures trouble-free continued operation without "plugging" or the like.

Turning again to the overall apparatus aspects of the invention, there are still further, additional and yet somewhat more specific objects including: (a) the provision of a pelleting machine conforming with the preceding objects, and designed to be mounted on a single frame, and operated through the use of a single motor; (b) the provision of such an apparatus which includes a supply or storage hopper and a separate material feed chamber for delivering the particulate material to the compression or pellet-forming components, but wherein the delivery of material from the supply or storage to the separate feed chamber is controlled through the movement of the compression plunger component; (c) the provision of such an apparatus which includes means for sensing the quantity of material in the separate feed chamber and rendering the means for delivering material from the supply to such chamber inactive when there is excess material in the chamber; (d) the provision of such an apparatus which incorporates the improved drive system provided hereby to reciprocally move the compression plunger in response to rotation of a primary drive shaft thereby minimizing the number of drive components, and particular bearings; and (e) the provision of such an apparatus wherein a mechanical drive including a ratchet and ratchet wheel reacts between the reciprocating compression plunger and a supply or storage conveyor to selectively deliver material from the supply or storage hopper to the final feed chamber in response to reciprocable movement of the compression plunger.

The invention lies in the combination, arrangement, disposition and cooperation between various component parts and assemblies and sub-assemblies included in an apparatus constructed in accordance herewith, as well as in the form of certain components. The invention will be better understood, and objects other than those specifically set forth above will become apparent when consideration is given to the following detailed description. Such description makes reference to the annexed drawings presenting preferred and illustrative embodiments hereof.

Basic apparatus

Figures 1, 11, 14:
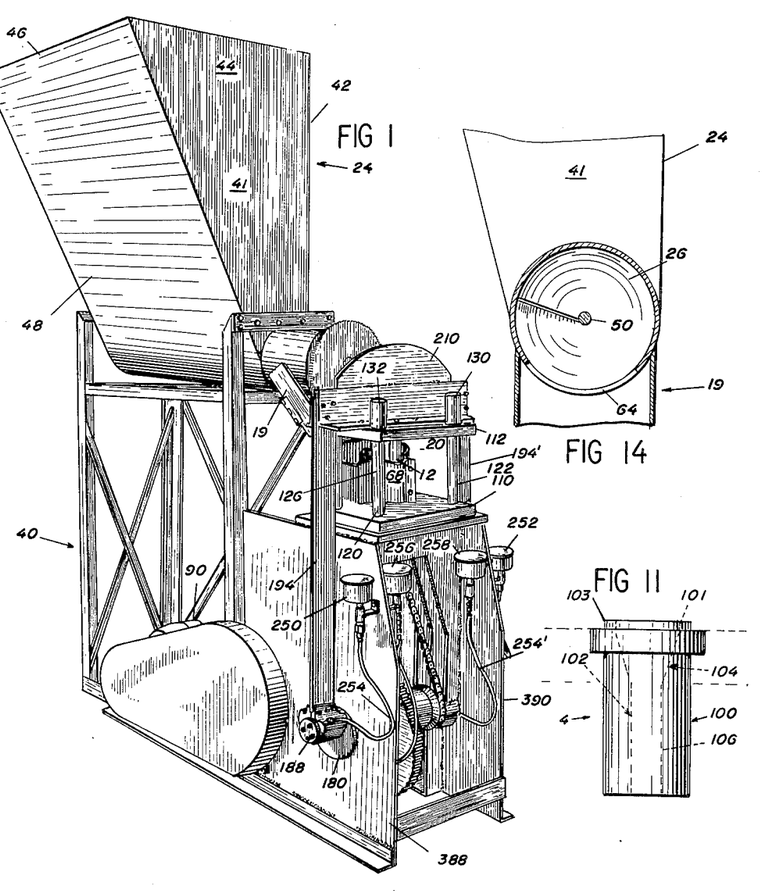
FIGURE 1 is a perspective view of an apparatus constructed in accordance with the present invention.
FIGURE 11 is a side view of one form of compression nozzle utilized in the apparatus of FIGURE 1.
FIGURE 14 is a sectional view, taken on the line 14—14 of FIGURE 13 and showing the manner in which the forward portion of the supply feed conveyor is supported at the base of the hopper shown in FIGURE 13.

Before referring specifically to the preferred construction of actual component parts of the overall apparatus shown in FIGURE 1, it is desirable to understand the general basic cooperating components of the pelleting machine provided hereby. Accordingly, attention is initially directed to FIGURE 16. By referring to the schematic showing of this figure, it will be noted that the apparatus includes a pellet-forming means, generally designated by the numeral 4 which has at least one open-ended passageway 6 therein. The passageway is constricted, as at 8, between opposite open ends thereof.

Figures 16, 17:
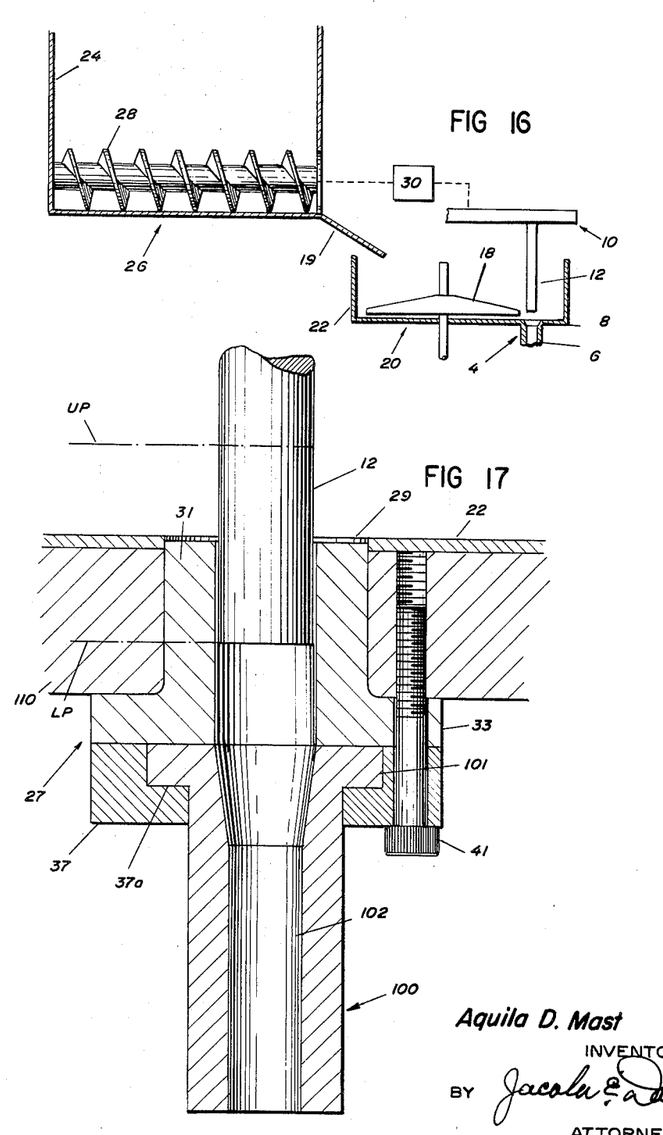
FIGURE 16 is a schematic fragmental side view of an aparatus such as shown in FIGURE 1, FIGURE 16 presenting illustratively the disposition and cooperation between various basic components and sub-assemblies of the apparatus hereof.
FIGURE 17 is a fragmental side view of a pellet forming nozzle and the components of the apparatus hereof which cooperate therewith to support the same in position and provide a proper passageway means.

A plunger means generally designated by the numeral 10 is incorporated, and such plunger means includes a plunger 12 reciprocally movable into and out of closing relation with the upper end of the passageway 6. The plunger 12, as explained more fully below, serves to compress particulate material in the pellet-forming means.

In actual operation, the plunger means and the passageway of the pellet-forming means cooperate to provide the pellets. However, the pellets are formed within the passageway, and thus the means providing the passageway has been referred to as the forming means for convenience. To deliver particulate material to the open upper end of the passageway 6 of the pellet-forming means and under the compression plunger 12 of the plunger means, a primary feed means, generally designated by the numeral 20 is used. The primary feed means 20 includes a housing 22 and a drivable material feed element 18 which is mounted for movement in the housing 22 to push particulate material toward the plunger 12 or upper end of the passageway 6.

For the purpose of storing material and selectively delivering the same to the primary feed means 20, there is provided a storage hopper 24 and a supply feed means 26. The supply feed means includes a supply feed element 28 in the form of a screw, drivable to move particulate material to the primary feed means through gravitational descent over the delivery chute 19 extending between the base of the hopper 24 and the housing 22.

A supply drive means 30 coacts between the plunger means 10 and the supply feed element 28 to drive the supply feed element in response to reciprocation of the plunger means. As explained more particularly in connection with FIGURES 2 and 3 below, a primary drive means is incorporated for reciprocally driving the plunger means whereby the compression plunger cyclically moves into and out of closing relation with the upper end of the passageway 6.

From the preceding description, it should be apparent that when particulate material is stored in the hopper 24 and the apparatus is operated, the particulate material is moved from the hopper by the supply feed means, or more particularly the driven supply feed element or screw 28 and onto the chute 19. The material, through gravitational descent, passes into the housing 22 and is then urged under the plunger 12 and toward the open end of the passageway 6 by the driven material feed element 18. The particulate material, after passing under the plunger 12, and with cyclic operation thereof, is compressed in the passageway 6. Initially, it may be desirable to block the passageway 6 so as to close one end thereof thus permitting initial compression of material therein. Once sufficient material has been compressed therein, then it engages the side walls of the passageway 6 sufficiently tightly below the constriction 8 to form what may be deemed a "false bottom" piston chamber. Thus, with cyclical reciprocation of the plunger 12, successive quantities of particulate material are compressed with descent of the plunger, and the compression created between the bottom of the plunger and the top of the previously compressed pellet.

Bearing the above general explanation in mind, attention can now be directed to the individual component parts and sub-assemblies incorporated in the actual apparatus of FIGURE 1. It will be noted from FIGURE 1 that the respective component parts and sub-assemblies are mounted on a common frame generally designated by the numeral 40.

Supply and supply feed means

Disposed at the upper rear end of the apparatus shown in FIGURE 1 is the hopper 24 which comprises a hollow container. Such container preferably has a vertical side wall 42, two downwardly tapered end walls 44 and 46, and an inwardly sloped side wall 48 opposite the side wall 42. The hopper is suitably fixed in position on frame 40, as by welding.

Figure 13:
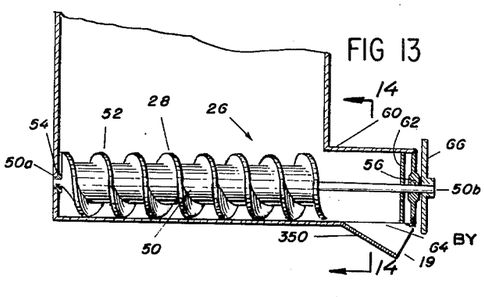
FIGURE 13 is a fragmental sectional view of the base of the supply hopper incorporated in the apparatus of FIGURE 1, FIGURE 13 showing the supply feed conveyor incorporated in such hopper.

Journaled in the base of the hopper 24 is the supply feed means 26 which, as indicated above, preferably comprises a screw conveyor 28. The screw conveyor 28 is turn includes a central shaft 50 and a helically formed continuous blade 52. The shaft 50 has one end 50a (the rear end) journaled in the rear bearing 54 in wall 46, and has its opposite end 50b (forward end) journaled in a front bearing 56. The bearing 56, as shown in FIGURE 13, is supported in position by a plurality of radial arms (not shown) which extend from the bearing 56 to adjacent end wall portions of the outlet tube or nozzle 60 fixed to wall 44 and leading from the base of the hopper 24. The outlet tube or nozzle 60 is closed by the wall 62, disposed behind bearing 56, but has an opening 64 in the bottom portion thereof. Thus, as the screw 28 is rotated, material is fed to the right, as shown in FIGURE 13, so that the same passes through the opening 64 and onto the chute 19.

For purposes of driving the shaft 50 of the screw 28, a ratchet wheel 66 is fixed on the forward end 50b of the shaft 50, and to achieve this mounting, the shaft 50 extends through a suitable opening in the forward wall 62 of the nozzle 60.

Primary feed means

Figures 4, 5, 6, 8, 15:
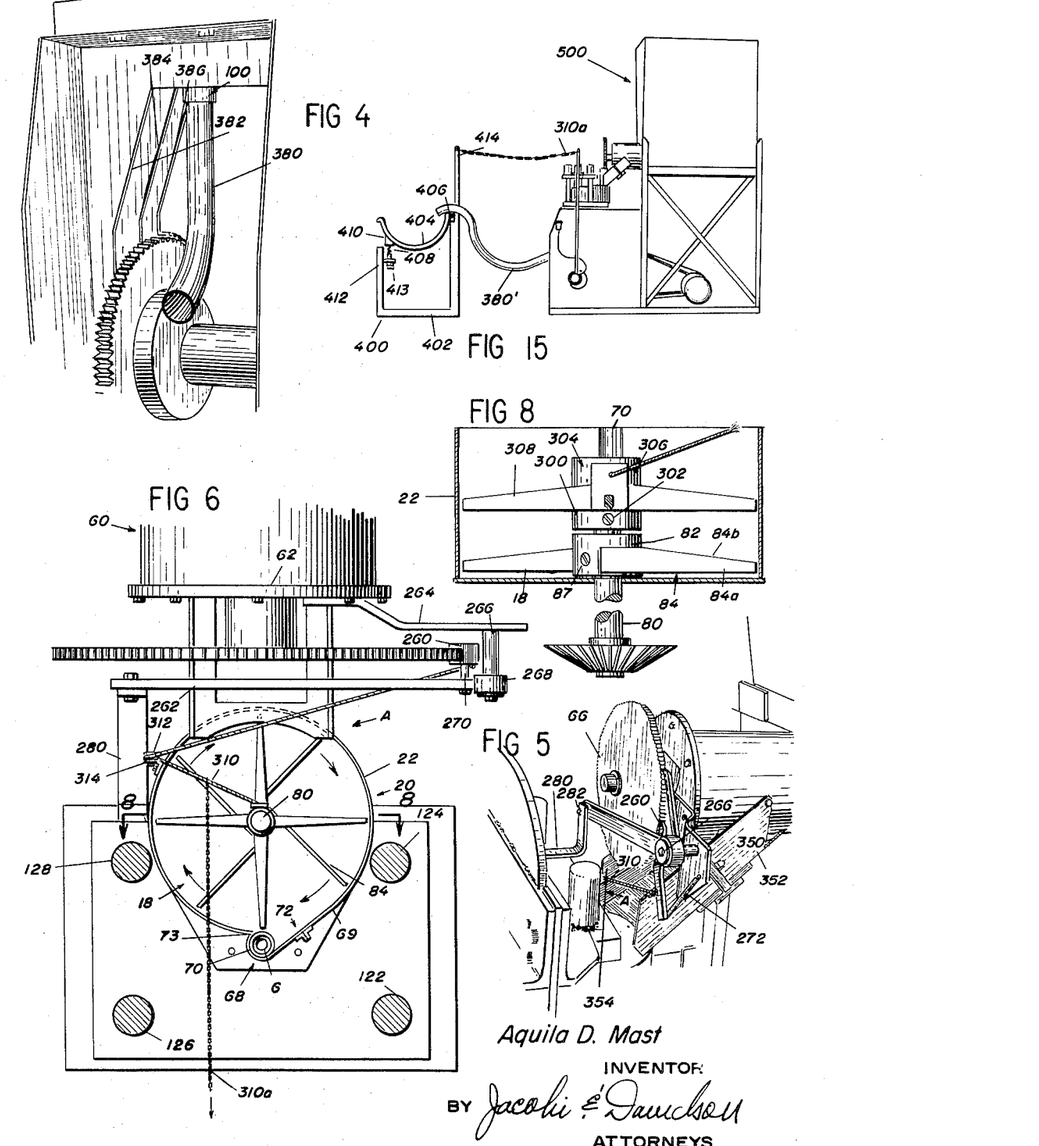
FIGURE 4 is a fragmental front perspective view showing the disposition of the pellet outlet tube of the apparatus of FIGURE 1 with respect to the frame and primary drive shaft of such apparatus.
FIGURE 5 is a fragmentary elevational view of the drive means incorporated in the apparatus of FIGURE 1 which reacts between the reciprocating plunger assembly and the feed storage or supply system to selectively cause delivery of particulate material from a supply hopper to a primary feed compartment.
FIGURE 6 is a fragmental plan view of the drive assembly shown in FIGURE 5, and additionally shows the primary feed compartment and its associated components.
FIGURE 8 is a fragmental sectional side view taken on line 8—8 of FIGURE 6, and presenting details of the primary feed assembly of the apparatus shown in FIGURE 1.
FIGURE 15 is a side elevational view showing the apparatus of FIGURE 1 as operatively associated with an animal feed trough incorporating means for activating the apparatus when the trough is engaged by an animal.

As stated above, the material which passes onto the chute 19, travels under gravitational action down the chute 19 and into the housing 22 of the primary feed means 50. The housing 22 of the primary feed means 20 is generally circular in contour, as best shown in FIGURE 6. However, adjacent the forward end of such housing, as shown in FIGURE 1, or adjacent the lower end of such housing, as shown in FIGURE 6, the side walls of the housing depart from the circular contour to provide a swirl, as at 68. More particularly, as best shown in FIGURE 6, the side wall of the housing extends in a circle throughout the major portion of the housing, but then has an outwardly extending sloped forward portion 69 which terminates in a semi-circular extension 70. The extension 70 curves back to again join the circular contour as at 73. To permit the shaping of the side wall of the housing 22 as indicated above, a bracket joint 72 is incorporated.

The semi-circular extension at the forward end of the housing 22 extends peripherally about the passageway 6 of the pellet-forming means. Thus, the inlet end of the passageway 6 is disposed interiorly of the housing 22 but not within the circular contour of the major portion thereof. Instead, the inlet to the passageway 6 is disposed in the extension 70. The reason for this disposition will be better understood after consideration is given in more detail to the primary feed element or feed wheel 18.

If reference is made to FIGURES 6 and 8, it will be noted that a shaft 80 extends upwardly into the housing 22, and centrally of the circular contour of such housing. Mounted on the shaft 80 is the primary feed element 18 which, as shown in FIGURES 6 and 8, comprises a hub 82 having a plurality of veins or spokes 84 extending outwardly from the periphery thereof. The spokes 84 preferably have a flat lower edge 84a and a downwardly outwardly tapering upper edge 84b. They are fixed to the hub by any suitable means, as for example by welding, and the hub in turn is fixed to the shaft 80 as by a set screw 87. Thus, with rotation of the shaft 80, the hub 82, and in turn the spokes or veins 84 rotate within the housing 22. By virtue of the circular contour of the housing 22 over the major portion thereof, the spokes are free to rotate, and if rotated clockwise as shown in FIGURE 6, the spokes act on particulate material within the housing 22 to force the same outwardly. This results in delivering the particulate material to and within the semi-circular extension 70. It will be noted that such extension opens tangentially of the housing 22 on the input side thereof, and is generally curved rearwardly to block the opposite side. Accordingly, particulate material is efficiently delivered to the extension 70 by the feed element 18 upon rotation of the shaft 80.

Figure 3:
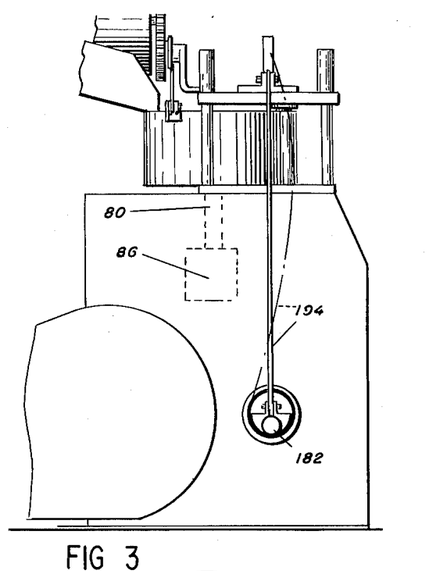
FIGURE 3 is a fragmental side view, similar to FIGURE 2, but showing the drive and associated components in the positions which they occupy when the compression plunger is in a compressing position.

As shown in FIGURE 3, the shaft 80 extends downwardly through the bottom of the housing 22, and has its lower end journaled within a gear box 86. The gear box 86 is driven in any suitable manner by a motor 90 (FIGURE 1). Here, it should be understood that the motor 90 serves as the single motor necessary to drive the various components of the apparatus hereof. The connection between the motor and the gear box 86 is conventional, and it is sufficient to here understand that the feed wheel or element 18 is driven positively by the motor 90.

In summary, the primary feed means serves to deliver particulate material to the open end of the passageway 6. It comprises the feed chamber 22 which is mounted on the frame 40, and drivable feed means in the chamber, namely, the element or wheel 18, for forcing material therein toward the open end of the nozzle or passageway 6.

Pellet-forming means

Figure 12A:
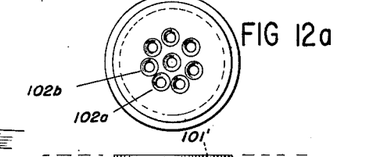
FIGURES 12a and 12b are, respectively, plan and side views of another form of compression nozzle, similar to that shown in FIGURE 11, but incorporating multiple compression passageways.
Figure 12B:
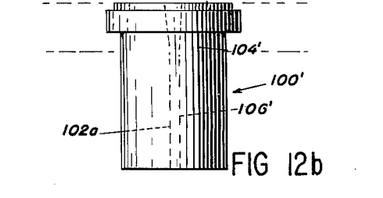

In the initial discussion of the apparatus with particular respect to FIGURE 16, it is noted that pellets were formed in the passageway 6 of the pellet-forming means generally designated by the numeral 4. As shown in FIGURES 11 and 12, the pellet-forming means preferably comprises a forming nozzle or tube. In FIGURE 11, the forming nozzle is generally designated by the numeral 100, and is shown as having a passageway 102 therein. The passageway 102 is open at opposite ends, and has an inwardly and downwardly tapered first portion 104 and a second portion 106 of uniform cross section. The second portion 106 is contiguous to the first portion 104 at the smaller end of the first portion, and the second portion 106 is longer than the first portion. With the embodiment of FIGURE 11, there is a single pellet-forming passageway in the nozzle 100, but with the apparatus hereof, a multiple passageway forming nozzle can be used. Thus, as shown in FIGURES 12a and 12b, a plurality of passageways are provided in the nozzle 100'. These passageways have corresponding portions to the single passageway of FIGURE 11, and prime numerals have been used to designate the corresponding relation.

It is to be noted that with both the arrangement of FIGURE 12, and the arrangement of FIGURE 11, there is an initial short portion 101 or 101' of uniform cross section at the upper end of the nozzle. This portion is adapted slidably to receive the lower end portion of a compression plunger. In fact, the compression plunger travels to a position adjacent the start of the taper in the passageway or passageways, as the case may be.

It has been found that one particularly important and significant consideration regarding the pellet-forming means resides in the smoothness which is given to the interior side walls of the passageway or passageways in which the pellets are formed. Here, we are concerned with that portion of the passageway from the start of the taper downwardly, or from the lower extremity of the movement of the plunger means. It has been discovered that the smoothness of such parts or portions should be at least 10 micro-inch or less. "Micro-inch" is defined as .000001 inch. (See Machineries Handbook, 13th ed., The Industrial Press, New York, 1946.)

Without the provision of a smoothness of less than 100 micro-inch, it has been found that the forming nozzle becomes subject to plugging, and in certain instances, the operation of the apparatus even becomes somewhat erratic. Thus, the smoothness of the interior surface of the passageway in the forming nozzle constitutes an important aspect of the present invention.

As indicated in connection with the discussion specifically relating to FIGURE 6, the forming nozzle, whether of the single passage type or the multiple passage type, is supported on the frame 40 at the forward end of the primary feed housing 22. As shown in FIGURE 17, the nozzle 100 is mounted adjacent the bottom wall 23 of the housing 22.

The nozzle 100 is coupled to the support plate 110, as shown in FIGURE 17, by a coupling means 27 which includes an upper coupling member 29 having an upstanding nozzle portion 31 and a laterally extending flange portion 33. A bore 35 extends through the upstanding nozzle portion 31 and the flange portion 33 so as to provide a passageway communicating directly with the passageway 102 in the nozzle 100. A laterally projecting coupling flange 101 is disposed at the upper end of the nozzle 100 and this flange cooperates with a recessed portion 37a in a lower coupling collar 37. The lower coupling collar 37 mates with the upper coupling member 29 and is secured thereto by means of bolts 41, only one of which bolts is shown in FIGURE 17. The bolts 41 pass through aligned apertures in the member 37 in the flange portion 33 and then into suitable threaded bores in the support plate 110.

The compression plunger 12, as shown in FIGURE 17, is movable from an upper position designated by the phantom line UP to a lower position designated by the phantom line LP. More specifically, these phantom lines define the upper and lower limits of travel of the plunger 12.

With the disposition of the nozzle 100 and the cooperating support means therefor, all as shown and described in connection with FIGURE 17, the primary feed element or wheel 18 serves to deliver the particulate material to the open upper end of the nozzle 100, or specifically the upper end of the passageway 35, and therethrough to the open upper end of the nozzle 100, and under the compression plunger now to be discussed.

*Plunger means*

The plunger means 10 described in connection with FIGURE 16 includes, as shown in FIGURE 1, a pair of supports 110 and 112 each in the form of a support plate, and guide means 120 which mount the upper support 112 for reciprocal movement with respect to the lower support 110.

The guide means 120 includes a plurality of upstanding posts 122, 124, 126 and 128 (FIGURES 1 and 6). Such posts are mounted on the lower support 110 and receive at their upper ends, in slideable relation thereon, bearing cylinders 130, 132 and 134. Additionally, a fourth bearing cylinder (not shown) is provided at the corner of the support plate 112 not shown in the drawings. In other words, four posts are incorporated as part of the guide means, and a bearing cylinder is carried by the support 112 to cooperate with each of the posts so as to symmetrically mount the support 112 for linear reciprocating movement with respect a vertical axis, or the longitudinal axis of the posts 122, 124, 126 and 128.

Figure 7:
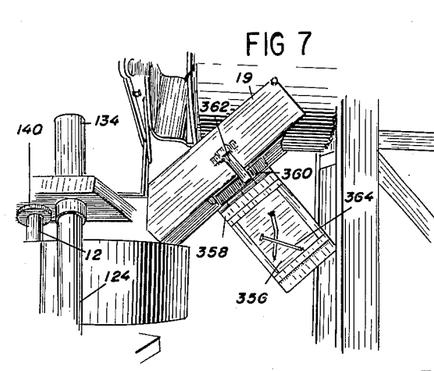
FIGURE 7 is a fragmental elevational view presenting in some detail the preferred form of delivery chute provided between the supply hopper conveyor and the primary feed compartment of the apparatus of FIGURE 1.
Figure 9:
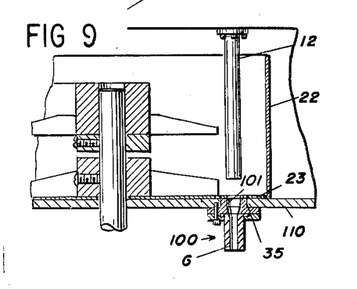
FIGURE 9 is a fragmental sectional view of the compartment shown in FIGURE 8, and further presents the relationship of the components thereof with respect to the compression plunger when in non-compression position.
Figure 10:
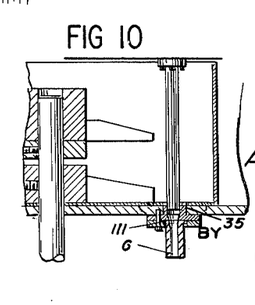
FIGURE 10 is a fragmental sectional view, similar to FIGURE 9, but presenting the component relationship when the compression plunger is in compressing position.

The support 112 carries the compression plunger 12 in depending relation thereto. Specifically, as shown in FIGURE 7, the plunger 12 is fixed to the plate 112 by a coupling collar or flange 140. With linear reciprocating movement of the support 112 with respect to the support 110, the plunger 12 moves into and out of closing relation with the passageway 35, as illustrated by the respective positions of the plunger in FIGURES 9 and 10.

In essence, the supports 110 and 112, which as indicated, preferably take the form of plates, and the cooperating posts and bearing cylinders discussed in this section, serve as a guide means for mounting the plunger 12 on the frame 40 for reciprocal movement into and out of the open end of the forming nozzle communication with the housing 22. The provision of the posts and the bearing cylinders insures linear reciprocal movement of the plunger and thereby proper alignment of the same with respect to the pellet-forming means or forming nozzle.

*Primary drive means*

Figure 2:
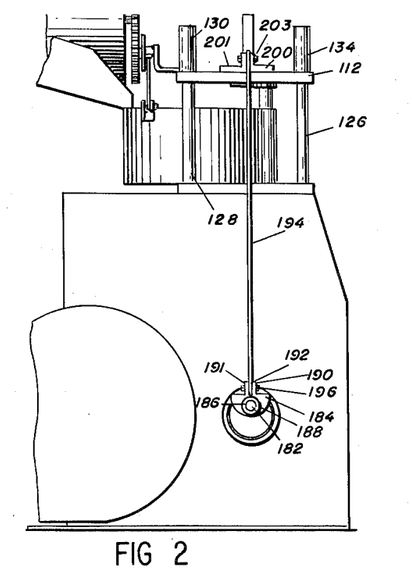
FIGURE 2 is a fragmental side view of the apparatus shown in FIGURE 1, FIGURE 2 presenting the drive and associated components in the positions which they occupy when the compression plunger is in non-compressing position.

The motor 90 (FIGURE 1) serves as the power source for driving or reciprocating the support 112 carrying the compression plunger 12 thereon. To this end, the motor 90 drives a main driveshaft 180 which is journaled for rotation in the frame 40 by suitable bearings. Although the drive of shaft 180 and mounting thereof is generally conventional, the shaft 180, itself, is special. Such shaft, has formed integrally therewith and projecting from opposite ends thereof, a pair of eccentrics. The eccentrics are generally identical, and one such eccentric is shown in FIGURES 2 and 3 and designated by the numeral 182. During rotation of the main shaft 180, the eccentric 182 moves between an upper position as shown in FIGURE 2 and a lower position as shown in FIGURE 3.

Rotatably mounted on the eccentric 182 is a bearing bracket 184 which has a bore 186 therein dimensioned to rotatably receive the eccentric 182. The bearing bracket 184 is maintained in place by a bearing washer 188 which maintains the bearing bracket 184 on the eccentric 182. The bearing bracket 184 has upstanding flanges 190 and 191 which define a spring arm receiving recess 192 therebetween. Disposed in such recess is the lower end of a spring arm 194, the spring arm being fixed in the recess by means of a bolt 196.

Although only one spring arm and coupling bracket are shown in FIGURES 2 and 3, it will be understood that an identical spring arm and coupling bracket are provided on the opposite side of the apparatus from that shown in FIGURES 2 and 3. More specifically, the spring arm 194' is mounted at its lower end in a corresponding coupling bracket to that designated by the numeral 184, which bracket in turn is mounted on an eccentric corresponding to that designated by the numeral 182.

The upper ends of the respective spring arms 194 and 194' are fixed to the upper support 112 of the plunger means. For this purpose, as shown in FIGURE 2, a pair of elongated right angle members 200 and 201 are mounted on top of the support 112 and extend thereacross projecting beyond opposite ends thereof. Each of the right angle members 200 and 201 is fixed to the support 112 as by welding, and/or bolts, and the upstanding legs of each of the right angle members 200 and 201 are spaced apart so as to receive the upper end of a spring arm therebetween.

As shown in FIGURE 2, the upper end of the spring arm 194 is fixed between the upstanding legs of the right angle members 200 and 201 by means of a bolt 203. Similarly, the spring arm 194' is fixed between the upstanding legs of the right angle members 200 and 201 by means of a bolt or bolts. In fact, it should be here understood that while welding has been suggested as a means for securing herein, and while bolts have similarly been suggested as a means of securing herein, either or both of the securing means can be used individually or in combination depending on the strength desired.

With respect to strength, it will be noted that an auxiliary plate 210 is disposed between the upstanding legs of the members 200 and 201, such plate extending between the central portions of the right angle members 200 and 201 for support. Such plate additionally maintains the proper spaced relation between the right angle members intermediate the coupling of such right angle members with the respective spring arms 194 and 194'.

Referring again specifically to FIGURES 2 and 3, the operation of the primary drive means will be better understood. As shown in FIGURE 2, the eccentric 182 is in its upper position, and therefore, the support 112 has moved to its uppermost position, the spring arm forcing the same upwardly with sliding movement of the respective bearing cylinders 130–134 on the respective guide posts 122–128. As the eccentric 182 is moved to its lower position, the spring arm flexes, but the movement of the support 112 is linear by virtue of the cooperation between the guide posts and the sliding bearing cylinders. With continued rotation of the shaft 180 clockwise as shown in FIGURES 2 and 3, the spring arm 194 again flexes as shown in phantom in FIGURE 3, and the support 112 again moves to its upper position shown in FIGURE 2.

The drive means just described thus serves as an apparatus for transforming rotary motion into linear reciprocating motion. Such apparatus, in this sense, comprises (1) a frame means, including the forward portion of the frame means 40, (2) a drive shaft 180 rotatably mounted on the frame means, (3) a pair of eccentrics 182 mounted on the drive shafts in spaced apart relation to one another, and integrally formed therewith, (4) a plurality of guide posts 122–128 mounted on the frame means, (5) a driven member, support 112, mounted on the posts for linear reciprocal movement thereon between upper and lower positions, (6) a pair of bearings 184 rotatably mounted on the eccentrics 182 for eccentric movement with respect to the axis of rotation of the shaft 180 between upper and lower positions, and (7) a pair of spring arms 194, 194'. Each of the spring arms is fixed at one end to a different one of the bearings 184 and fixed at the opposite end to the driven member or support 112. Moreover, the spring arms have sufficient flexibility to permit flexing thereof during movement of the bearings and the support member between the upper and lower positions thereof.

It is significant to note that with such a drive arrangement, the moving parts are minimized. No bearings are required at the upper ends of the spring arms, and the only bearings required are at the lower ends thereof, namely, the bearing brackets 184.

As shown in FIGURE 1, to properly lubricate such bearings, oil reservoirs 250 and 252 are incorporated. Each reservoir includes a feed line 254 which feeds interiorly of its respective associated bearing bracket 184 to provide for continuous lubrication thereof. The primary drive shaft 180 is similarly lubricated adjacent the bearings supporting the same in the frame means 40. For this purpose, the reservoirs 256 and 258 are incorporated, and each of these reservoirs includes a line 254' leading to the bearing in question. Although the bearings for the main drive shaft are not shown in detail, their construction is conventional and a detailed showing or explanation thereof appears unnecessary.

*Supply drive means*

In the preceding sections of this specification, attention has been directed to the pellet-forming means, the compression plunger means, the primary feed means for delivering particulate material to the pellet-forming means and under the compression plunger, the primary drive means for reciprocally driving the plunger means, and the supply feed means for delivering particulate material to the primary feed means. However, no mention has been made specifically of the manner in which the supply feed means is driven or operated.

Consistent herewith the supply drive means provided, preferably takes the form of that exemplary presented in FIGURE 16 and designated by the numeral 30. Such drive means coacts between the plunger means and the supply feed element for driving the supply feed element in response to reciprocation of the plunger means.

To understand the detailed construction of such supply drive means, attention is initially now directed to FIGURES 5 and 6. As noted above, a ratchet wheel 66 is fixed on the shaft 50 of the feed screw 28 disposed at the base of the hopper 24. Obviously, with rotation of the ratchet wheel 66, the screw 28 is driven to feed material in the hopper forwardly and toward and onto the chute 19. The ratchet wheel 66 comprises part of the supply feed drive means, but in addition, such means includes a drive ratchet 260 and a drive bar 262.

As shown in FIGURE 6, a mounting bracket 264 is fixed on the forward exposed face of the front wall 62 of the outlet passageway or nozzle 60 of the hopper 24. Mounted on this bracket 264 is a pivot shaft 266 which carries rotatably thereon the pivot bracket 268. Fixed to the pivot bracket 268 and extending to the left thereof, as shown in FIGURE 6, is the bar 262. The bar 262 carries a pivot shaft 270 which in turn serves to pivotally mount the ratchet 260. In order to urge the ratchet normally into engagement with the peripheral teeth on the ratchet wheel 66, a spring 272 is coupled between the lower end of the ratchet 260 and the mounting bracket 264.

As shown in FIGURE 5, the lower end of the ratchet 260 is normally urged in a counter-clockwise direction thus urging the upper end thereof into engagement with the teeth on the periphery of the ratchet wheel 66. Now, from the respective mounting of the components, as shown in FIGURE 6, with upward movement of the bar 262 about its pivot shaft 266, the ratchet 260 is caused to move upwardly with the result that the the upper end thereof engages the peripheral teeth on the ratchet wheel 66 thereby causing the same to move counter-clockwise. In other words, as the drive bar 262 is lifted upwardly from the position shown in FIGURE 5, it pivots about the pivot shaft 266. This raises the ratchet 260 and in turn raises the tooth on the ratchet wheel 66 engaged by the upper end of the ratchet. Accordingly, the ratchet wheel 66 rotates counter-clockwise as shown in FIGURE 5.

To cause the upward movement of the drive bar 262, a coupling bracket 280 is incorporated. This bracket is pivotally fixed, as by a bolt 282, with the left end portion of the bar 262 (FIGURE 6). The bracket 280 is of right angle construction, and the base leg thereof rests on the support 112. The weight of the bar 262 normally maintains the bracket 280 in engagement with the support 112, and thus the bracket 280 reciprocates with the support 112. As a result of the reciprocating motion of the support 112, the bar 262 pivotally moves up and down about its pivot shaft 266 because of the mechanical link between such bar and the support 112 provided by the bracket 280.

The supply drive means just described therefore coacts between the plunger means and the supply feed element for driving the supply feed element, namely, screw conveyor 28, in response to reciprocation of the plunger means. In other phraseology, the means for driving the mechanical conveyor or screw 28 comprises a mechanical means coacting between the means mounting the plunger and the conveyor, for driving the conveyor in response to reciprocal movement of the plunger. The mechanical means, in essence, comprises a ratchet drive.

*Supply feed control means*

From the preceding discussion, it will be understood that with reciprocation of the support 112, material is fed by the screw conveyor 28 onto the chute 19 and then into the housing 22 of the primary feed means. Quite naturally, and inherent in the nature of the screw conveyor, there may not be an even feed from the hopper to the primary feed means or housing 22 with each rotation of the screw. Moreover, the screw is incrementally moved by virtue of the ratchet drive, and thus absolutely uniform feed is difficult to achieve.

To compensate for any irregularities in feed, and eliminate further feed of material in the event that an excess of material exists in the housing 22, there is provided a supply feed control means. Such means operates in response to the existence of excess particulate material in the housing 22 and serves to render the supply drive means inoperative to drive the supply feed elements until the excess of particulate material in the housing 22 is eliminated.

The construction and operation of this particular means will be better understood by reference to FIGURES 6 and 8. As shown in FIGURE 6, a support collar 300 is fixed on the shaft 80 by means of a set screw 302. Mounted above the collar 300 is a mechanical sensing element in the form of a sensing wheel 304. The wheel 304 comprises a hub 306 and a plurality of veins 308 projecting radially outward therefrom, the hub and veins forming together a rotatable sensing member. The sensing member is journaled on the shaft 80 above the feed member 18 for rotation about the shaft 80 independent of rotation of the shaft itself. In other words, whereas the feed member 18 is fixed on the shaft 80, the sensing member is loosely journaled thereon so that the same does not rotate with the shaft.

Instead, the sensing member is responsive to excess material in the housing. More particularly, as particulate material is fed into the housing 22, it is initially directed in a generally circular path whereby it enters the opening to the extension 70 (FIGURE 6). The particulate material, however, can build up within the housing 22, and if the same reaches the level of the lower edge of the veins 308 of the sensing member 304, the same engages the veins 308 thereof thereby causing the sensing member to rotate in the same direction as the material is being moved, namely, clockwise as shown in FIGURE 6. If the level of particulate material in the housing 22 is below the lower edge of the veins 308 of the sensing member 304, then such member does not rotate. However, as explained, when the material engages the veins 308, the same rotates clockwise, and this clockwise rotation is used to control the supply drive means.

By reference to FIGURES 5 and 6, it will be noted that a flexible cable 310 is connected at one end to the hub 306 of the sensing member 304. The cable 310 is trained about a pulley 312 mounted in a bracket 314 carried on the side wall of the housing 22, and passes transversely across the rear end of the housing 22 to connect with the lower end of the ratchet 260. With clockwise rotation of the sensing member 304, the cable 310 is moved in the direction of the arrows A and this results in moving the lower end of the ratchet 260 inwardly or to the left as shown in FIGURE 5.

As a result of this inward movement of the ratchet, the upper end thereof is moved out of the path of engagement with the periphery of the ratchet wheel 260. Thus, as particulate material builds up in the housing 22, the sensing member 304 rotates clockwise as shown, and in turn pulls on the cable 310 which in turn pulls on the lower end of the ratchet 260, and moves the same out of engagement with the ratchet wheel 66. The sensing member 304 pulls on the cable until a level of particulate material in the housing 22 is lowered below the lower edge of the veins 308, whereupon the sensing member 304 returns to its initial position under the action of the spring 272 which normally urges the ratchet 260 into engagement with the teeth on the periphery of the ratchet wheel 66. This urging action in turn normally urges the cable 310 to the position shown in FIGURE 6.

From this discussion, it should be apparent that the supply feed control means comprises a sensing rotatable member, and a connector means extending between the sensing member and the ratchet to move the ratchet to a position out of engagement with the gear wheel or ratchet wheel 66 regardless of pivotal movement of the support 112 or drive bar 262. In other words, when the ratchet 260 is moved out of engagement with the ratchet wheel 66 by virtue of a pull on the cable 310 due to rotation of the sensing member 304, further reciprocation of the support 112, or plunger carried thereby, does not result in further feed of particulate material from the supply hopper 24. So long as the ratchet is out of engagement with the ratchet wheel, the ratchet wheel is not rotated, and in turn the conveyor or screw 28 is not rotated. Accordingly, particulate material is maintained in the supply hopper until the level of material in the housing 22 sufficiently decreases. Thereafter, the supply feed means drive is again operative, and particulate material is fed from the supply hopper down the chute 19 and into the housing 22.

*The supply chute*

The supply chute 19 has only been generally referred to hereinabove. Such chute comprises a base wall 350 and upstanding walls 352 and 354 which serve to direct the material leaving the opening 64 downwardly over the bottom wall 350. (See FIGURES 5 and 7.) Preferably, to remove foreign material from the particulate material passing to the housing 22, magnet 356 forms part of the base wall 350. As shown in FIGURE 7, a hinge 360 mounts a door 358 on the base wall 350 of the chute 19. The door 358 carries a permanent magnet 356 which, when the door is closed, forms a portion of the upper surface of the base wall 350. To maintain the door is closed position, as opposed to the open position shown in FIGURE 7, a suitable latch 362 is incorporated. Thus, the door 358 can be opened to the position shown in FIGURE 7 to remove the foreign material such as nails 364 thereon. Thereafter, the door can be closed so that the magnet forms part of the chute 19, serving to remove foreign material, particularly iron and other magnetic materials from the particulate material being delivered from the hopper to the primary feed means.

*Operation*

While the operation of the overall apparatus should be apparent from the preceding description, a brief summary of the operation may well be helpful.

Initially, when the motor 90 is started, the main drive shaft 180 is rotated. Simultaneously, the shaft 80 is driven through the gear box 86 and this results in driving the feed wheel or element 18. In turn, rotation of the main drive shaft results in moving the eccentrics 182 between their upper and lower positions. The bearing brackets 184 move on the eccentrics to cause the spring arms 194 to carry the upper support 112 cyclically between its respective upper and lower positions. With movement of the support 112 between its upper and lower positions, the plunger 12 cyclically moves into and out of closing relationship with the forming nozzle, whether it be of the single passage or multiple passage type. With each downward movement of the plunger 12, material under the plunger fed to the extension 70 of the housing 22 is forced into the passageway illustratively designated by the numeral 6 in FIGURES 9, 10 and 16. As indicated above initially, some means is used to plug the lower end of the passageway, and permit the build-up of particulate material within the passageway. Thereafter, successively formed pellets provide a false bottom to the passageway which cooperates with the plunger 12 to compress the new material and form additional pellets therefrom.

The particulate material to be pelleted is supplied from the hopper 24 upon operation of the screw 28. Such material passes down the chute 19 and into the housing 22 whereupon the same is urged in the direction of the upper open end of the passageway 6 by the feed element or wheel 18. Reciprocation of the support 112 cyclically lifts the drive bar 262, which in turn cyclically moves the ratchet 260 into driving engagement with the ratchet wheel 66 whereupon the ratchet wheel 66 rotates thereby moving the screw 28 to deliver further material.

Should the level of material in the housing 22 exceed that desired, then the material being moved by the feed element or wheel 18 engages the sensing element or wheel 304, in turn causing the same to rotate. Rotation of the sensing wheel or element 304 pulls on the cable 310 thereby moving the ratchet 260 out of driving engagement with the ratchet wheel 66 until such time as the level within the housing 22 decreases to its desired level, whereupon the ratchet 260 again moves into driving engagement with the ratchet wheel 66 so that the same operates upon the screw conveyor 26 to deliver further material down the chute 19 and into the housing 22.

The compressive force which is maintained within the forming tube or nozzle 100 or 100′, or a suitable substitute therefor, is sufficient to permit delivery of pellets formed therein for extensive distances. Thus, there may well be coupled to the lower end of any such forming nozzle a delivery tube such as that designated by the numeral 380 in FIGURE 4. Such tube merely constitutes an open extension of the particular forming nozzle being used, but permits the delivery of pellets from the forming nozzle to its desired position. The coupling between the tube and the forming nozzle can be of any conventional design. Similarly, the particular supports used in the frame can be of any desired design provided that sufficient strength exists for each component. In this latter regard, it will be noted from FIGURES 1 and 4 that a plurality of vertical support plates 382, 384 and 386 are incorporated as part of the frame means 40 to give the desired support and strength to the vertical side plates 388 and 390 which respectively carry the drive components and the supports of the plunger means.

Pelleting heat

An important feature of the operation of the instant invention not emphasized in the immediately preceding detailed description relates to the heating of the pellets formed by the apparatus hereof. Due to the compression which takes place in the forming nozzle or tube, a substantial quantity of heat is generated. This heat is absorbed by the pellets which are formed, and in fact aids in the formation thereof when the material possesses only the normal moisture content. Specifically, the normal moisture content of animal foodstuffs is between 10 and 13 percent, and this moisture content is sufficient to permit the pelleting operation under sufficient heat. During the pellet formation, substantial heat is generated by the compression and movement of the pellets within the forming tube, and thus the necessary heat is available. This heat serves to aid the forming of the pellets with low moisture content, and in addition, renders the ultimate pellets heated as they are delivered from the apparatus.

Modifications

Since the machine provided hereby produces heated pellets, and/or since the action of the machine is such that the formed pellets can be delivered over substantial distances, the machine is readily adapted to use as an automatic feeding equipment. In this regard, attention is directed to FIGURE 15. Here, the machine of FIGURE 1 is shown as provided with an outlet or delivery tube designated by the numeral 380'. This tube corresponds to the tube 380 discussed in connection with FIGURE 4. It leads, however, to an automatic feed trough generally designated by the numeral 400. The feed trough includes a frame 402 and a feed bin 404. The feed bin 404 is pivotally mounted at the rear end thereof with respect to the frame 402 by a pivot shaft 406. The forward end of the pin 404 is normally urged upwardly by a spring 408 which cooperates between a bracket 410 carried at the forward lower end of the bin 404 and a bracket 412 carried on frame 402 and aligned with bracket 410. The bin 404 is thus normally in the position shown in FIGURE 15. The spring 408, however, is capable of being compressed if a downward force is exerted against the bin 404.

Consistent herewith, if an animal engages the bin 404 and moves the same downwardly, then the lever 414 secured to the bin is caused to move to the left, as shown in FIGURE 15. Movement of the lever 414 to the left results in pulling the cord 310 since the lever 414 is coupled to the cord 310 by an auxiliary cord 310a (see FIGURES 6 and 15). The auxiliary cord 310a may comprise, in part, a chain and in part a cord, or merely a cord or merely a chain, as the case may be. The important point is that movement of the lever 414 results in a forward pull on the cord 310, i.e., a downward pull with reference to FIGURE 6.

It will be remembered that such a pull on the cord 310 moves the ratchet 260 out of driving engagement with the ratchet wheel 66 normally when the level of material in the housing 22 is above a predetermined level. However, with the arrangement of FIGURE 15, this disengagement is also achieved when the lever 414 moves in the manner explained above, i.e., to the left as shown in FIGURE 15.

Accordingly, if the feed bin 404 is filled to a predetermined level with pelletized material, then the lever 414 is moved to its forward or left position, as explained, and thereupon the ratchet 260 is moved out of driving engagement with the ratchet wheel 66. This condition remains until such time as the level within the feed bin 404 decreases to a predetermined point. When a minimum of pelletized material is in the bin 404, i.e., the level has decreased to such predetermined point, then the lever 414 has returned to its rear or right position (FIGURE 15) and the ratchet 260 again engages the ratchet wheel 66.

The delivery of heated pellets to the bin 404 results in a suitable aroma there-adjacent, and stimulates the urge of the animal to consume more pellets, thereby rendering the animal more suitable to market.

Conclusion

After reading the foregoing detailed description of the illustrative and perferred embodiment of the present invention, it should be apparent that the objects set forth at the outset of the present specification have been successfully achieved.

Accordingly,

What is claimed is:

1. Apparatus for pelletizing particulate material comprising the combination of:
    (a) pellet forming means having at least one open-ended passageway therein constricted between opposite open ends thereof;
    (b) plunger means, including a plunger reciprocally movable into and out of closing relation with one end of said passageway, for compressing particulate material in said passageway;
    (c) primary feed means for delivering particulate material to said one end of said passageway and under said plunger;
    (d) primary drive means for reciprocally driving said plunger means whereby said plunger cyclically moves into and out of closing relation with one end of said passageway;
    (e) supply feed means for delivering particulate material to said primary feed means, said supply feed means including a supply feed element drivable to move particulate material to said primary feed means; and,
    (f) supply drive means coacting between said plunger means and said supply feed element for driving said supply feed element in response to reciprocation of said plunger means.

2. The combination defined in claim 1 wherein said open-ended passageway has an inwardly tapered first portion adjacent said one end, and a second portion of uniform cross-section contiguous to said first portion at the smaller end thereof; said second portion being longer than said first portion and being disposed between said first portion and the end of said passageway opposite said one end.

3. The combination defined in claim 2 wherein said passageway has an inner peripheral surface extending throughout said first and second portions which has a smoothness of at least a 10 micro-inch maximum finish.

4. The combination defined in claim 3 wherein said plunger means comprises a pair of supports and guide means mounting one of said supports for reciprocal movement with respect to the other, said plunger being fixed on said one support mounted for reciprocal movement with respect to the other, and wherein said primary feed means comprises a housing and a drivable material feed element mounted for movement in said housing to push particulate material toward said plunger, said one end of said passageway opening into said housing, said plunger being reciprocally movable in said housing.

5. The combination defined in claim 4 and further including supply feed control means responsive to the existence of excess particulate material in said housing to render said supply drive means inoperative to drive said supply feed element until the excess of particulate material in said housing is eliminated.

6. The combination defined in claim 5 wherein said drivable material feed element comprises a rotatable feed member, and said supply feed control means comprises a rotatable sensing member; wherein said primary feed means includes a driven shaft extending within said housing and wherein said feed member is fixed on said shaft for rotation therewith and said sensing member is journaled on said shaft above said feed member for rotation about said shaft independent of rotation thereof whereby said sensing member is rotatably responsive to excess material in said housing which engages said sensing member.

7. The combination defined in claim 6 wherein said supply drive means comprises a gear wheel drivingly coupled to said supply feed element, a pivotally mounted drive bar linked to said one support for pivotal movement of said bar in response to reciprocal movement of said one support, and a ratchet carried on said bar and engageable with said gear wheel to rotate said rear gear wheel in response to pivotal movement of said bar; and wherein said supply feed control means includes connector means extending between said sensing member and said ratchet to move said ratchet to a position out of engagement with said gear wheel regardless of pivotal movement of said drive bar.

8. The combination defined in claim 7 wherein said primary drive means includes a drive shaft, a pair of eccentrics integrally formed on said shaft, in spaced apart relation, a pair of bearings mounted on respective of said eccentrics, and a pair of spring arms fixed at one end to said bearings and fixed at their opposite ends to opposite sides of said one support.

9. Apparatus for pelletizing particulate material comprising the combination of:
 (a) frame means;
 (b) a hopper mounted on said frame means;
 (c) a feed chamber mounted on said frame means;
 (d) delivery means including a mechanical conveyor for moving material from said hopper to said feed chamber;
 (e) a forming nozzle having an open end communicating with said feed chamber;
 (f) a plunger;
 (g) means mounting said plunger on said frame for reciprocal movement into and out of said open end of said nozzle;
 (h) drivable rotatable feed means in said chamber for forcing material therein toward said open end of said nozzle;
 (i) drive means for reciprocating said plunger and rotating said feed means; and,
 (j) means for driving said mechanical conveyor.

10. The combination defined in claim 9 wherein said means for driving said mechanical conveyor comprises mechanical means coacting between said means mounting said plunger and said conveyor for driving said conveyor in response to reciprocal movement of said plunger.

11. The combination defined in claim 10 wherein said mechanical means comprises a ratchet drive.

12. The combination defined in claim 11 wherein said ratchet drive comprises a gear wheel drivingly coupled to said conveyor, a pivotally mounted drive bar linked to said plunger for pivotal movement of said bar in response to reciprocal movement of said one plunger, and a ratchet carried on said bar and engageable with said gear wheel to rotate said gear wheel in response to pivotal movement of said bar.

13. In an apparatus for pelletizing particulate material and including a compression passageway, a compression plunger reciprocally movable into and out of said passageway for compressing material therein, feed means for delivering material to said passageway for compression therein by said compression plunger, and storage means for storing particulate material, the improvement comprising drivable delivery means for delivering material from said storage means to said feed means, and drive means coacting between said plunger and said drivable delivery means for driving said delivery means in response to reciprocal movement of said plunger.

14. The improvement defined in claim 13 wherein said delivery means comprises a screw conveyor, and wherein said drive means includes a ratchet wheel mounted on said conveyor, a ratchet engageable with said ratchet wheel to drive said wheel, and mechanical coupling means reacting between said plunger and said ratchet for cyclically moving said ratchet into driving engagement with said ratchet wheel.

15. The improvement defined in claim 14 and further including mechanical sensing means movable in response to an excess of material in said feed means, and mechanical means connected between said sensing means and said ratchet to move said ratchet out of engagement with said ratchet wheel in response to movement of said sensing means.

References Cited by the Examiner

UNITED STATES PATENTS

| | | |
|---|---|---|
| 657,607 | 9/1900 | Luzatto. |
| 836,488 | 11/1906 | Cumpston _________ 100—45 |
| 1,313,764 | 8/1919 | Thurston _________ 74—581 |
| 2,063,404 | 12/1936 | Selman _________ 107—8.35 |
| 2,245,608 | 6/1941 | Rogers _________ 27—17 |
| 2,310,748 | 2/1943 | Pearson. |
| 2,403,476 | 7/1946 | Berry et al. _________ 18—12 |
| 2,532,320 | 10/1950 | Maussnest _____ 100—282 X |
| 2,833,633 | 5/1958 | Hecht _________ 44—13 |
| 2,951,379 | 9/1960 | Longfield _____ 100—214 X |
| 3,008,434 | 11/1961 | Maldari _________ 107—14 |
| 3,038,420 | 6/1962 | Immohr _________ 107—14 |
| 3,062,130 | 11/1962 | Huber et al. _____ 100—216 |
| 3,109,313 | 11/1963 | Lott _________ 74—581 X |

FOREIGN PATENTS

| | | |
|---|---|---|
| 1,369 | 1880 | Great Britain. |

WALTER A. SCHEEL, *Primary Examiner.*